Oct. 10, 1944.   G. WIKKENHAUSER   2,359,886
ELECTRICAL POWER SUPPLY SYSTEM
Filed Dec. 16, 1943

Inventor:
GUSTAV WIKKENHAUSER
by J. O. Ollier,
Atty.

Patented Oct. 10, 1944

2,359,886

UNITED STATES PATENT OFFICE 2,359,886

ELECTRICAL POWER SUPPLY SYSTEM

Gustav Wikkenhauser, near Wells, England

Application December 16, 1943, Serial No. 514,459
In Great Britain May 11, 1942

5 Claims. (Cl. 290—40)

The present invention relates to electrical power supply systems, and has for its object the provision of an electrical power supply system suitable for feeding auxiliary electrical equipment on a vehicle where the load on the system varies substantially and the bulk and weight of the system have to be kept reasonably small. The invention is especially concerned with aircraft, but it is also applicable to other vehicles, such for example as power boats.

In generating electrical power in an aircraft a generator may be driven either from the main engines of the aircraft, or from an auxiliary engine. The disadvantage of using the main engines are: firstly that the speed of the generator and hence the power (and frequency, if a synchronous A. C. generator is used) are dependent on the speed of the engines only and bear no relation to the load on the generator which might vary in the proportion of 2:1 or more; secondly that for ground test of any piece of auxiliary apparatus driven from the generator it is necessary to start the main engines of the aircraft. In the case of an A. C. generator, variations of frequency produce a variation in the performance of inductive loads, e. g. power supply transformers for radio apparatus. Therefore it appears to be preferable to use any auxiliary engine.

It is obviously desirable that the generator should be as light and compact as possible; this means that the generator should be run at high speed, for in this way more power can be obtained for given volume. A high-speed D. C. generator would be difficult to design owing to high brush wear and commutation trouble and also to the difficulty met with in all D. C. supply systems if forms of apparatus of differing voltage requirement are required to be used simultaneously. Therefore an A. C. generator is indicated as being the preferable type.

For ease of starting for freedom from running troubles and for small weight/power ratio, an internal-combustion engine using a volatile fuel appears the preferable form of prime mover for the generator, particularly an engine of the spark-ignition fuel-injection type. Whatever form of prime mover is used however, it will have a characteristic such that it can deliver more power at higher speeds. Therefore as the load increases on the generator, it will be convenient to drive it at higher speed. With a normal type of A. C. generator, the supply frequency produced will be dependent on the speed, with the resultant difficulties in feeding the loads which have been mentioned above. If the engine is arranged with constant speed control means, its average efficiency over the whole load range will be reduced compared with the efficiency at the optimum load.

According to this invention, an electrical power supply system for feeding auxiliary electrical equipment of a vehicle, e. g. an aircraft, includes an asynchronous generator, exciting means for producing an alternating exciting current of constant frequency for said generator, a motor, which is preferably an auxiliary internal-combustion engine of the fuel-injection type, arranged to drive said generator, and automatic means responsive to variation in the load on the system for varying the speed of said motor, independently of the speed of any main propelling motor of the vehicle, in such a manner as to match the output of said generator to said load.

Preferably the asynchronous generator is a three-phase generator. A three-phase asynchronous generator comprises a three-phase stator and an induction-motor type rotor. The three-phase stator is fed with a three-phase magnetising current of constant frequency, and the rotor is driven above synchronous speed, i. e. above the speed of rotation of the magnetic field produced by the stator. Under these circumstances the stator windings draw from the exciting means a wattless or mainly wattless current (in which the current vector lags the exciting voltage vector) and they have induced in them a current leading the voltage of the exciting means, which current is of the same frequency as the exciting current and which is used to supply useful energy to a load. The frequency of the useful current is always the same as that of the exciting means and is independent of the speed of rotation of the rotor.

Asynchronous generators have hitherto been mainly limited to their application to power boosters at sub-stations linked to a main A. C. network, or to power-factor correctors at places where the load is mainly inductive. They have usually been run with only small variations in speed. Normally an asynchronous generator when used in this way is coupled to the A. C. network from which it takes a small amount of magnetising current, and it feeds back to the network a current with a leading power factor. In this case the field windings of the asynchronous generator are excited from the same A. C. network into which the generator is feeding current. The present invention however employs a separate source of exciting current which is of substantially constant frequency and which is independent from the network into which the generator supplies power.

Two embodiments of the invention will be described by way of example with reference to the accompanying diagrammatic drawing, in which.

Figure 1:
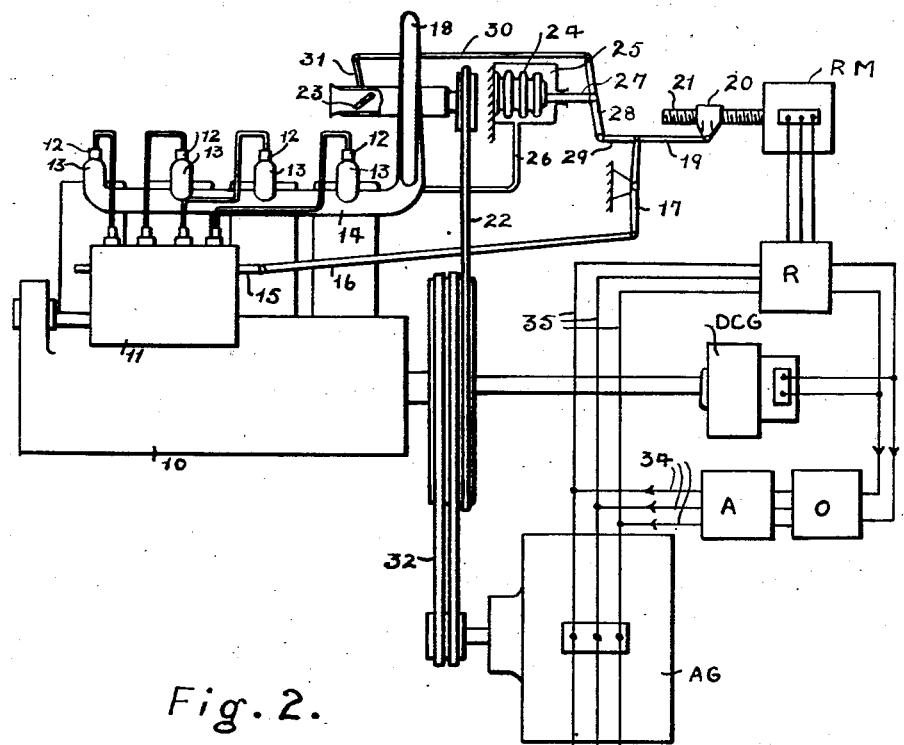
Fig. 1 shows a preferred arrangement of power supply system for aircraft.

An internal-combustion engine 10 (Fig. 1) of the spark-ignition type has a battery of fuel-injection pumps 11 feeding respectively injection nozzles 12 arranged to spray fuel into the inlet valve ports which are supplied with air through branches 13 from a manifold 14. The pump unit 11 has a rack 15 of known type slidable for the purpose of varying the quantity of fuel injected per cycle, and this is connected by a link 16 to a two-armed lever 17 which constitutes the power control member of the engine and which also controls the delivery of a barometrically compensated super-charger 18 arranged to feed the air manifold 14. The lever 17 is coupled by a link 19 to a nut 20 engaged on a screw-threaded extension 21 of the shaft of a reversible electric motor RM.

The supercharger 18, which is of centrifugal type, is coupled to the flywheel of the engine 10 by speed-increasing belt gearing 22 and is provided with a throttle valve 23 on its air intake. A pressure sensitive bellows 24 has one end fixed within an airtight casing 25, which communicates by a pipe 26 with the air manifold 14, and the other end of the bellows carries a slidable rod on which is pivoted a two-armed lever 26. One arm of this lever is connected to the upper arm of the control lever 17 by a link 29 while the other arm is connected by a link 30 to a lever 31 fast on the spindle of the throttle 23. The arrangement is such that if the manifold pressure rises or falls, the throttle 23 closes or opens automatically, the floating lever rocking about its lower end.

A three-phase asynchronous generator AG is coupled to the engine 10 by speed-increasing belt gearing 32 and its stator windings are connected to the auxiliary supply mains 33. The engine 10 also drives a compound-wound D. C. exciter generator DCG which energises a valve oscillator O arranged to produce three-phase current of fixed frequency. The output of the oscillator is fed to an amplifier A which in turn feeds the stator terminals of the asynchronous generator AG by the leads 34. The amplifier A constitutes a high-impedance driving source; therefore any reaction on the stator windings of the asynchronous generator due to load variation will not be transmitted to the oscillator O.

A three-phase double-contact relay R of known type is also connected by leads 35 to the stator terminals of the generator AG. This relay is so arranged that, if the aggregate voltage in the three phases falls below a predetermined value, one set of contacts closes and energises the reversible motor RM from the generator DCG in such a sense that it operates the power control member 17 so as to accelerate the engine 10. If however this voltage rises above predetermined value the other set of contacts closes and the motor RM is energised in the opposite sense so that the engine 10 is retarded. In order that this voltage regulator system shall operate successfully under all conditions of load on the asynchronous generator, it is essential that the engine should be able to deliver more power to the generator, for all loads, than the generator itself is required to supply to the supply system. The asynchronous generator can be so designed that its power/speed curve is of the same form as and slightly below the power/speed curve of the engine. Under these conditions the combination of engine and alternator will form an inherently stable unit.

The rotating part of the generator has an armature substantially the same as a squirrel cage armature of an induction motor, and has no windings, slip-rings or commutators. The speed range of the engine may be 2,000 to 4,000 R. P. M., and the speed range of the alternator 15,000 to 30,000 R. P. M. Under these conditions the centrifugal force acting on the rotor is considerable and it would be difficult to prevent the windings of a conventional type of generator from flying off. This difficulty does not arise with the asynchronous type of generator. A supply current of 500 C. P. S., at 80 v. may conveniently be adopted, and for these conditions the rotor preferably has a high resistance.

Figure 2:
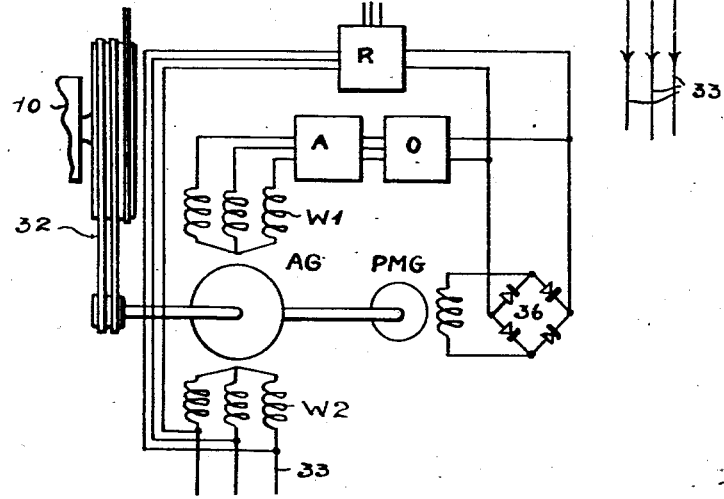
Fig. 2 shows a modification of certain parts of the system of Fig. 1.

The exciting field in the asynchronous generator may be produced in various ways. Thus, in place of the D. C. generator DCG a small permanent-magnet synchronous generator PMG (Fig. 2) may be directly coupled to the shaft of the asynchronous generator AG, the output of the synchronous generator being rectified at 36 and supplied to the oscillator O and reversing motor R. It is furthermore possible to provide the asynchronous generator with double stator windings W1 and W2, the winding W1 being connected to the exciting means and serves for the production of the magnetising field, while the winding W2 is connected to the supply mains 33.

An advantage of the improved arrangements is that, with a constant-frequency power supply, the power factor of the system may be kept near to unity, as lagging power factor in inductive loads may be corrected by means of condensers, which is not possible if the frequency varies.

I claim:

1. An electric power supply system for feeding auxiliary electrical equipment of a vehicle, the system including an asynchronous generator, a motor arranged to drive said generator, an exciter generator driven by said motor and feeding a valve oscillator for producing an alternating exciting current of constant frequency for said asynchronous generator, and automatic means responsive to variation in the load on the system for varying the speed of said motor, independently of the speed of any main propelling motor of the vehicle, in such a manner as to match the output of said generator to said load.

2. An electrical power supply system for feeding auxiliary electrical equipment of a vehicle, the system including an asynchronous generator of the three-phase type, exciting means for producing an alternating exciting current of constant frequency for said generator, a motor arranged to drive said generator and having a power control member, a reversing electric motor which actuates said power-control member, automatic means including an electrical relay of the three-phase double-contact type responsive to variations in the supply voltages of the respective phases of the system and arranged to control said reversing motor in such a manner as to match the output of said asynchronous generator to said load.

3. An electrical power supply system for feeding auxiliary electrical equipment of a vehicle, the system including an asynchronous generator, a motor arranged to drive said generator, a direct-current exciter generator driven by said motor and feeding an electrical oscillator for producing an alternating exciting current of constant frequency for said asynchronous generator, and automatic means responsive to variation in the load on the system for varying the speed of said motor, independently of the speed of any main propelling motor of the vehicle, in such a manner as to match the output of said asynchronous generator to said load.

4. An electrical power supply system for feeding auxiliary electrical equipment of a vehicle, the system including an asynchronous generator, a motor arranged to drive said generator, a permanent-magnet synchronous generator driven by said motor, a rectifier connected to receive the output of said synchronous generator and to feed an electrical oscillator for producing an alternating exciting current of constant frequency for said asynchronous generator and automatic means responsive to variation in the load on the system for varying the speed of said motor, independently of the speed of any main propelling motor of the vehicle, in such a manner as to match the output of said asynchronous generator to said load.

5. In an aircraft, an electrical power supply system for feeding electrical equipment of the aircraft and including an asynchronous generator, exciting means for producing an alternating exciting current of constant frequency for said generator, an auxiliary internal-combustion motor arranged to drive said generator, a barometrically-compensated supercharger for said motor and automatic means responsive to variation in the load on the system for varying the speed of said auxiliary motor in such a manner as to match the output of said generator to said load.

GUSTAV WIKKENHAUSER.